US009554438B2

(12) United States Patent
Hochman (10) Patent No.: US 9,554,438 B2
(45) Date of Patent: Jan. 24, 2017

(54) LIGHTING INTEGRATION INTO VIDEO AND POWER STREAM

(71) Applicant: REVOLUTION DISPLAY, INC., Glendale, CA (US)

(72) Inventor: Jeremy Hochman, Glendale, CA (US)

(73) Assignee: Revolution Display, LLC, Glendale, CA (US)

( * ) Notice: Subject to any disclaimer, the term of this patent is extended or adjusted under 35 U.S.C. 154(b) by 189 days.

(21) Appl. No.: 14/103,268

(22) Filed: Dec. 11, 2013

(65) Prior Publication Data

US 2015/0161938 A1  Jun. 11, 2015

(51) Int. Cl.
*H05B 33/08* (2006.01)
*G09G 3/22* (2006.01)
*G06F 3/14* (2006.01)
*G06T 1/20* (2006.01)

(52) U.S. Cl.
CPC ......... *H05B 33/0845* (2013.01); *G06F 3/1431* (2013.01); *G06T 1/20* (2013.01); *G09G 3/22* (2013.01); *G09G 2300/0443* (2013.01); *G09G 2352/00* (2013.01); *G09G 2370/04* (2013.01)

(58) Field of Classification Search
None
See application file for complete search history.

(56) References Cited

U.S. PATENT DOCUMENTS

| 2004/0178743 | A1* | 9/2004 | Miller | G09G 3/3225 315/169.3 |
| 2004/0233125 | A1* | 11/2004 | Tanghe | G06F 3/1446 345/1.3 |
| 2006/0077192 | A1* | 4/2006 | Thielemans | G06F 3/14 345/204 |

(Continued)

FOREIGN PATENT DOCUMENTS

| EP | 1898647 A1 | 3/2008 |
| EP | 2323122 A1 | 5/2011 |

(Continued)

OTHER PUBLICATIONS

International Search Report and Written Opinion dated Jun. 27, 2014, in corresponding International Application No. PCT/US2014/031018, filed Mar. 18, 2014.

(Continued)

*Primary Examiner* — Maurice L McDowell, Jr.
*Assistant Examiner* — Donna J Ricks
(74) *Attorney, Agent, or Firm* — Downs Rachlin Martin PLLC (57) ABSTRACT

Methods, devices, and apparatuses are disclosed. A device may receive display data and lighting data as a single signal, determine whether to display content associated with the display data, and determine whether to output the lighting data to a lighting element. The device may provide the display data to another device after determining to not display the content associated with the display data. The device may provide the lighting data to another device after (Continued)

determining to not output the lighting data to the lighting element. The display data and lighting data may respectively include data destined for different types of light-emitting diodes (LEDs). The data destined for the different types of LEDs may be sourced from different sources.

54 Claims, 6 Drawing Sheets

(56) References Cited

U.S. PATENT DOCUMENTS

| | | | |
|---|---|---|---|
| 2010/0045871 A1* | 2/2010 | Wu | H04N 11/186 348/667 |
| 2013/0027423 A1* | 1/2013 | Bae | G09G 3/3413 345/619 |

FOREIGN PATENT DOCUMENTS

| | | |
|---|---|---|
| WO | 9949446 A1 | 9/1999 |
| WO | 2004006570 A1 | 1/2004 |

OTHER PUBLICATIONS

ROE MC-18T Hybrid Outdoor Modular, Indoor Modular, by XL Video Holding NV. http://www.xlvideo.com/equipment/pdf/131 (Last viewed on Oct. 29, 2015).

* cited by examiner

LIGHTING INTEGRATION INTO VIDEO AND POWER STREAM

BACKGROUND

Display devices may include many display elements and many lighting elements. Different display elements may be configured to display different portions of an overall image. Different lighting elements may be configured to illuminate different items in different ways. Accordingly, different display data may be destined to different display elements. Similarly, different lighting data may be destined to different lighting elements. In existing systems, separate wires may transmit display data from a processor (e.g., a video processor) to an individual display element. Similarly, in existing systems, separate wires may transmit lighting data from a processor (e.g., a lighting processor) to an individual lighting element. However, the distance between the processor and the display element and/or lighting element may be substantial. In such circumstances, the amount of wiring used to transmit the display data and/or lighting data may be burdensome. Accordingly, there exists a need in the art for a more efficient system of transmitting display data to display elements and lighting data to lighting elements.

SUMMARY

Methods, devices, and apparatuses are disclosed. In an aspect, a method may include receiving display data and lighting data as a single signal, determining whether to display content associated with the display data, and determining whether to output the lighting data to a lighting element.

In an aspect, a device may includes a data receiving module configured to receive display data and lighting data as a single signal, and a controlling module configured to determine whether to display content associated with the display data, and determine whether to output the lighting data to a lighting element.

In an aspect, an apparatus may include a means for receiving display data and lighting data as a single signal, a means for determining whether to display content associated with the display data, and a means for determining whether to output the lighting data to a lighting element.

In another aspect, an apparatus may include a memory, and at least one processor coupled to the memory and configured to receive display data and lighting data as a single signal, determine whether to display content associated with the display data, and determine whether to output the lighting data to a lighting element.

Other aspects of methods, devices, and apparatuses described herein will become readily apparent to those skilled in the art based on the following detailed description, wherein various aspects of methods, devices, and apparatuses are shown and described by way of illustration. Such aspects may be used in many different forms and its details may be modified in various ways without deviating from the scope of the present disclosure. Accordingly, the drawings and detailed description provided herein are to be regarded as illustrative in nature and not as restricting the scope of the claims.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
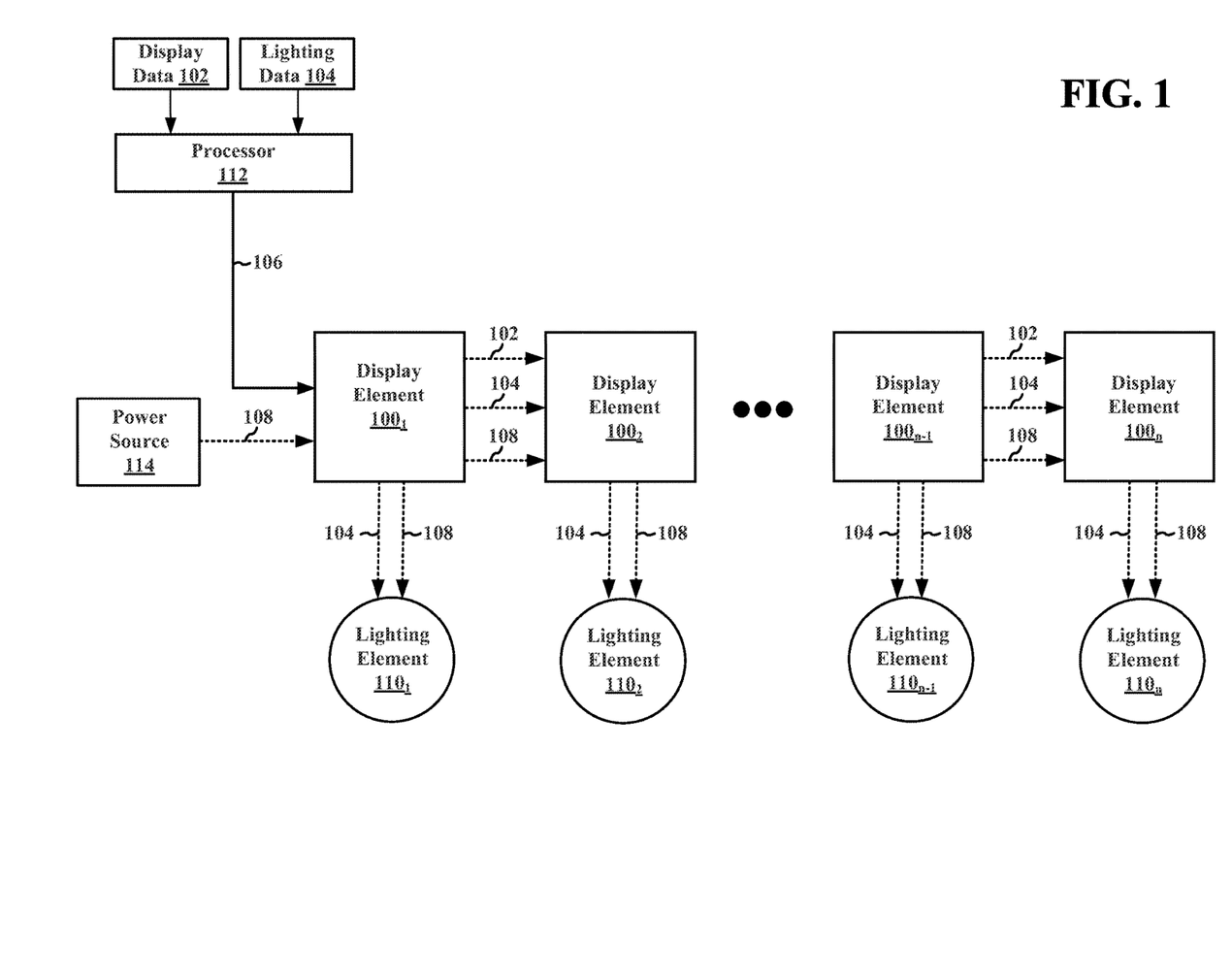
FIG. 1 is a diagram illustrating an example configuration of display elements and lighting elements.

FIG. 1 is a diagram illustrating an example configuration of display elements $100_1$ through $100_n$ and lighting elements $110_1$ through $110_n$. One of ordinary skill in the art will appreciate that 'n' may be any integer with a value greater than one. For example, tens or hundreds (or more) display elements $100_1$ through $100_n$ may be configured in series and/or in parallel relative to each other. Accordingly, one of ordinary skill in the art will appreciate that the example configuration provided in FIG. 1 is a non-limiting configuration provided for illustrative purposes and other configurations do not deviate from the scope of the disclosure provided herein.

In FIG. 1, each display element is associated with at least one lighting element (e.g., one of lighting elements $110_1$ through $110_n$). However, one of ordinary skill in the art will appreciate that the example configuration illustrated in FIG. 1 is a non-limiting configuration provided for illustrative purposes and other configurations do not deviate from the scope of the disclosure provided herein. For example, each display element (e.g., each of the display elements $100_1$ through $100_n$) may be associated with more than one lighting element (e.g., two or more of lighting elements $110_1$ through $110_n$).

Display data 102 may be provided to the processor 112. Lighting data 104 may be provided to the processor 112. The display data 102 and the lighting data 104 may be provided from separate sources or provided via separate means. For example, the display data 102 may be provided via a first wire from a first apparatus, and the lighting data 104 may be provided via a second wire from a second apparatus. The processor 112 may combine the display data 102 and the lighting data 104 and output a single signal 106. The single signal 106 may include inter alia display data 102 and lighting data 104. In some configurations, the processor 112 may multiplex the display data 102 and the lighting data 104. Accordingly, the single signal 106 may include multiplexed display data 102 and lighting data 104, as will be further described infra with reference to FIG. 2A. In some configurations, the single signal 106 may have a bandwidth having inter alia display data 102 in a first portion of the bandwidth and lighting data 104 in a second portion of the bandwidth, as will be further described infra with reference to FIG. 2B.

A power source 114 may provide power 108 to display element $100_1$. Although FIG. 1 illustrates an example of power 108 being provided to the display element $100_1$, one of ordinary skill in the art will appreciate that power 108 may alternatively or in combination be provided to lighting element $110_1$.

As described supra, display element $100_1$ may receive display data 102 and lighting data 104 as a single signal 106. The display element $100_1$ may determine whether to display content associated with the display data 102. For example, the display element $100_1$ may determine whether the display data 102 included in the single signal 106 is destined for that particular display element (e.g., display element $100_1$) or a different device or display element (e.g., any one or more of display elements $100_2, \ldots, 100_n$). If the display element $100_1$ determines to display the content associated with the display data 102, the display element $100_1$ may display such content. However, if the display element $100_1$ determines that the display data 102 is not destined for display element $100_1$, then the display element $100_1$ may provide the display data 102 to another device or display element (e.g., display element $100_2$) after determining to not display the content associated with the display data 102. Accordingly, as illustrated in FIG. 1, the display element $100_1$ may provide the display data 102 to display element $100_2$.

As described supra, display element $100_1$ may receive display data 102 and lighting data 104 as a single signal 106. The display element $100_1$ may determine whether to output the lighting data 104 to a lighting element (e.g., lighting element $110_1$). For example, the display element $100_1$ may determine whether the lighting data 104 is destined for lighting element $110_1$, which is associated with display element $100_1$. For instance, if the lighting data 104 is (at least in part) destined for the lighting element $110_1$, then the display element $100_1$ may output the lighting data 104 to the lighting element $110_1$. However, if the display element $100_1$ determines that the lighting data 104 is not destined for the lighting element $110_1$, then the display element $100_1$ may determine to not output the lighting data 104 to the lighting element $110_1$. Accordingly, the display element $100_1$ may output the lighting data 104 to another device or display element (e.g., display element $100_2$).

As described supra, the display element $100_1$ may be configured to receive power 108 from the power source 114. The display element $100_1$ may provide at least some of the power 108 to the lighting element $110_1$ after determining to output the lighting data 104 to the lighting element $110_1$. For example, after determining that the lighting data 104 is destined for the lighting element $110_1$, the display element $100_1$ may provide power 108 to the lighting element $110_1$ such that the lighting element $110_1$ has sufficient power to emit the illumination corresponding to the lighting data 104. However, if the display element $100_1$ determines to not output the lighting data to the lighting element $110_1$, the display element $100_1$ may refrain from providing the power 108 to the lighting element $110_1$.

The example configuration illustrated in FIG. 1 obviates the need for separate wires from the processor 112 to each individual display element (e.g., each of display elements $100_1$ through $100_n$) for providing the display data 102. Because the example configuration illustrated in FIG. 1 provides interconnectivity between different display elements (e.g., display elements $100_1$ through $100_n$), a separate wire is not needed from the processor 112 and each of the display elements (e.g., display elements $100_1$ through $100_n$) simply to provide the display data 102. The display data 102 may include information to allow each display element (e.g., each of display elements $100_1$ through $100_n$) to determine whether any portion of the display data is destined to that particular display element.

Similarly, because lighting elements (e.g., lighting elements $110_1$ through $110_n$) receive lighting data 104 from display elements (e.g., display elements $100_1$ through $100_n$) to which they may be near, separate wires are not needed from the processor 112 to each lighting element (e.g., lighting elements $110_1$ through $110_n$) to provide lighting data. For example, each lighting element (e.g., each of lighting elements $110_1$ through $110_n$) may receive lighting data 104 from the display element (e.g., one or more of display elements $100_1$ through $100_n$) that is closest in distance to that particular lighting element (relative to other lighting elements).

For similar reasons, the example configuration illustrated in FIG. 1 also obviates the need for separate power cables from the power source 114 to each individual lighting element (e.g., lighting elements $110_1$ through $110_n$) to provide power to the lighting elements (e.g., lighting elements $110_1$ through $110_n$). For example, the power source 114 may provide power 108 to a display element (e.g., display element $100_1$) that is able to, in turn, provide that power 108 to the lighting element (e.g., lighting element $110_1$) and/or other display elements (e.g., display element $100_2$), which may, in turn, provide power to other lighting elements (e.g., lighting element $110_2$).

Figure 2A:
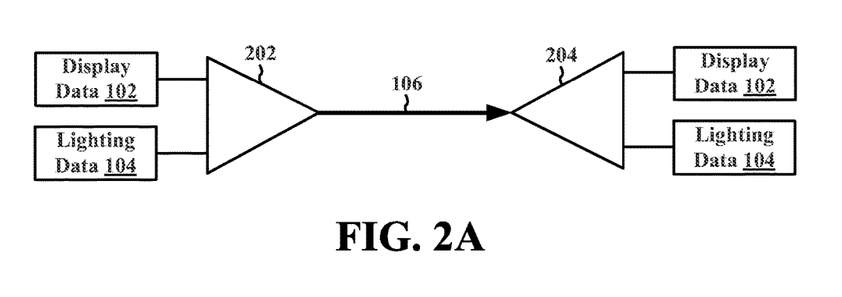
FIG. 2A is a diagram illustrating an example of multiplexing display data and lighting data.

FIG. 2A is a diagram illustrating an example of multiplexing display data 102 and lighting data 104. As described supra, in some configurations, the single signal 106 may include multiplexed display data 102 and lighting data 104. A multiplexer 202 may multiplex the display data 102 and the lighting data 104. The multiplexer 202 may be included in the processor 112. A de-multiplexer 204 may receive the single signal 106 and de-multiplex the single signal 106 to obtain the display data 102 and the lighting data 104. The de-multiplexer 204 may be included in the display element (e.g., the display element $100_1$). One of ordinary skill in the art will appreciate that the multiplexer 202 and the de-multiplexer 204 may be respectively configured to multiplex and de-multiplex other data and/or information without deviating from the scope of the present disclosure.

Figure 2B:
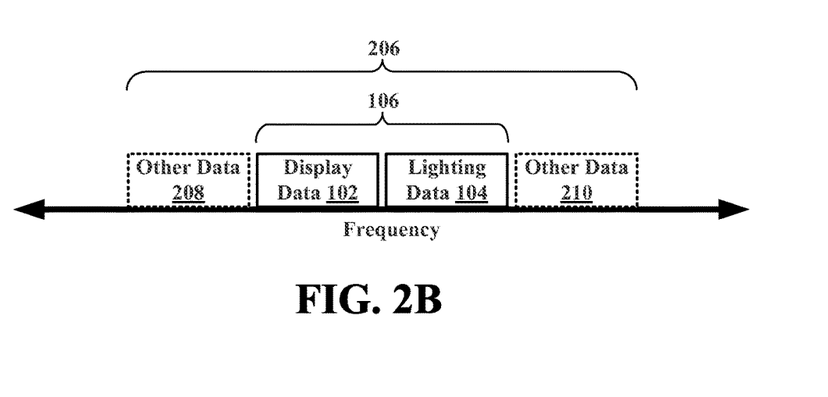
FIG. 2B is a diagram illustrating an example of display data and lighting data using different portions of a bandwidth.

FIG. 2B is a diagram illustrating an example of display data 102 and lighting data 104 using different portions of a bandwidth 206. The bandwidth 206 may be a frequency range for communication between a transmitter and a receiver. As described supra, the single signal 106 may have a bandwidth 206 having inter alia display data 102 in a first portion of the bandwidth and lighting data 104 in a second portion of the bandwidth. For example, the processor 112 may communicate with one or more of the display elements $100_1$ through $100_n$ using the bandwidth 206. The bandwidth 206 may also include other data 208, 210. One of ordinary skill in the art will appreciate that the display data 102, the lighting data 104, and the other data 208, 210 may be included in the bandwidth 206 in configurations that are different from the configuration illustrated in FIG. 2B without deviating from the scope of the present disclosure. In some configurations, the display element (e.g., any of display elements $100_1$ through $100_n$) may be configured to obtain the display data 102 from the first portion of the bandwidth 206 and to obtain the lighting data 104 from the second portion of the bandwidth 206. In some configurations, the lighting element (e.g., any of lighting elements 101$_1$ through 101$_n$) may be configured to obtain the lighting data 104 from the second portion of the bandwidth 206.

Figure 3:
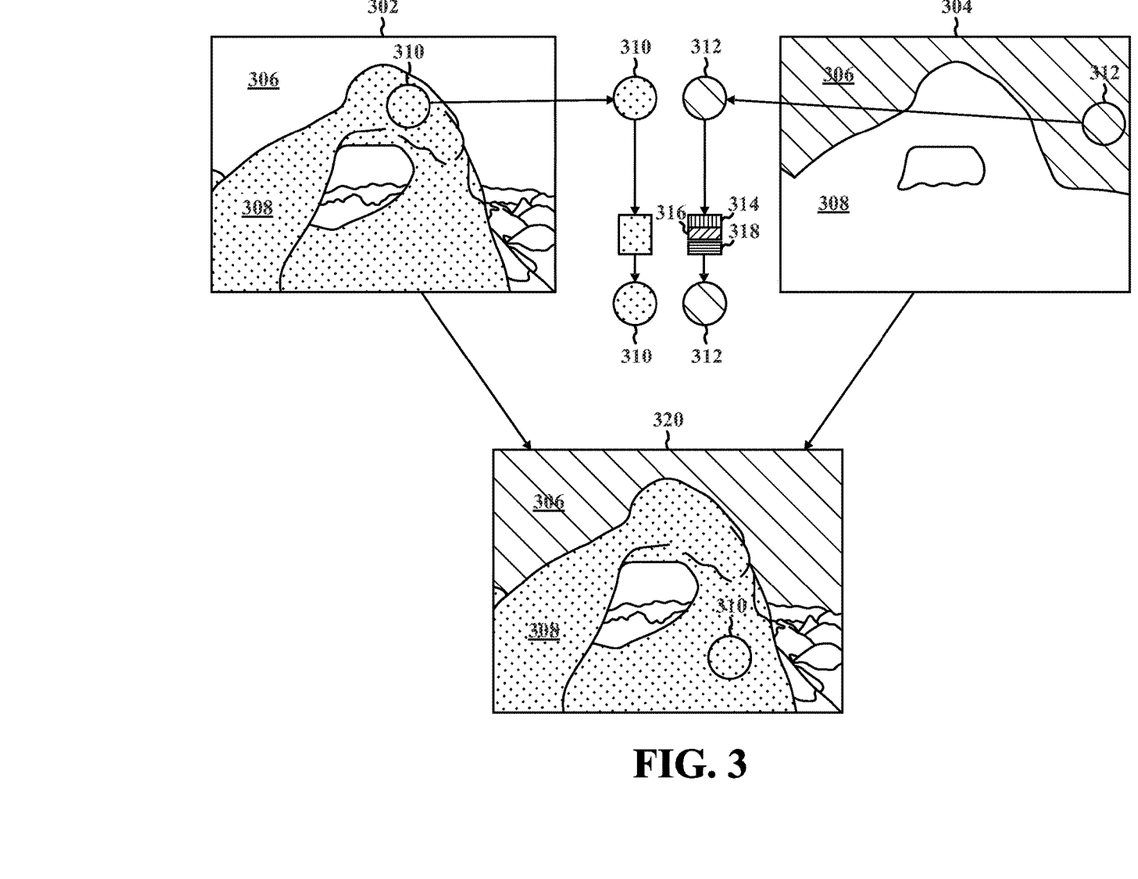
FIG. 3 is a diagram illustrating an example of display data and lighting data destined for different types of light emitting diodes (LEDs).

FIG. 3 is a diagram illustrating an example of display data 102 and lighting data 104 destined for different types of LEDs of the display element 320. A first data source may provide data corresponding to a first image 302. A second data source may provide data corresponding to a second image 304. Both images 302, 304 may have a foreground 308 and a background 306. In this example, the foreground 308 is a mountain, and the background 306 is the sky. The foreground 308 and the background 306 of the images 302, 304 may have different characteristics. A characteristic may be a color, a shade, a texture, a brightness, a contrast, or any other property. For example, the first mage 302 may have a foreground characteristic 310, and the second image 304 may have a background characteristic 312. The foreground characteristic 310 of the first image 302 may be the same as or different from the background characteristic 312 of the second image 304. The foreground characteristic 310 of the first image 302 and/or the background characteristic 312 of the second image 304 may be selected by a user, pre-selected by a computer program, or selected at random.

In some configurations, the display data 102 may be destined for a first type of LED (e.g., a white LED) of the display element 320. For example, the display data 102 may correspond to the foreground characteristic 310 of the first image 302, and such display data 102 may be destined for a white LED of the foreground 308 of the display element 320. The white LED may be configured to illuminate such that the display element 320 provides a target (e.g., desired or set) luminescence.

In some configurations, the lighting data 104 may be destined for a second type of LED (e.g., a red-green-blue (RGB) LED, or any other LED configured to emit at least red light 314, green light 316, blue light 318, cyan light, yellow light, amber light, magenta light, and/or any other color of light) of the display element 320. For example, the lighting data 104 may correspond to the background characteristic 312 of the second image 304, and such lighting data 104 may be destined for an RGB LED of the display element 320. The RGB LED may be configured to illuminate such that the display element 320 provides a target (e.g., desired or set) color.

Accordingly, the foreground 308 of the display element 320 provides a target luminescence using the first type of LED (e.g., white LED) in a manner that corresponds to the foreground characteristic 310 of the first image 302. Also, the background 306 of the display element 320 provides a target color using the second type of LED (e.g., RGB LED) in a manner that corresponds to the background characteristic 312 of the second image 304.

Figure 4:
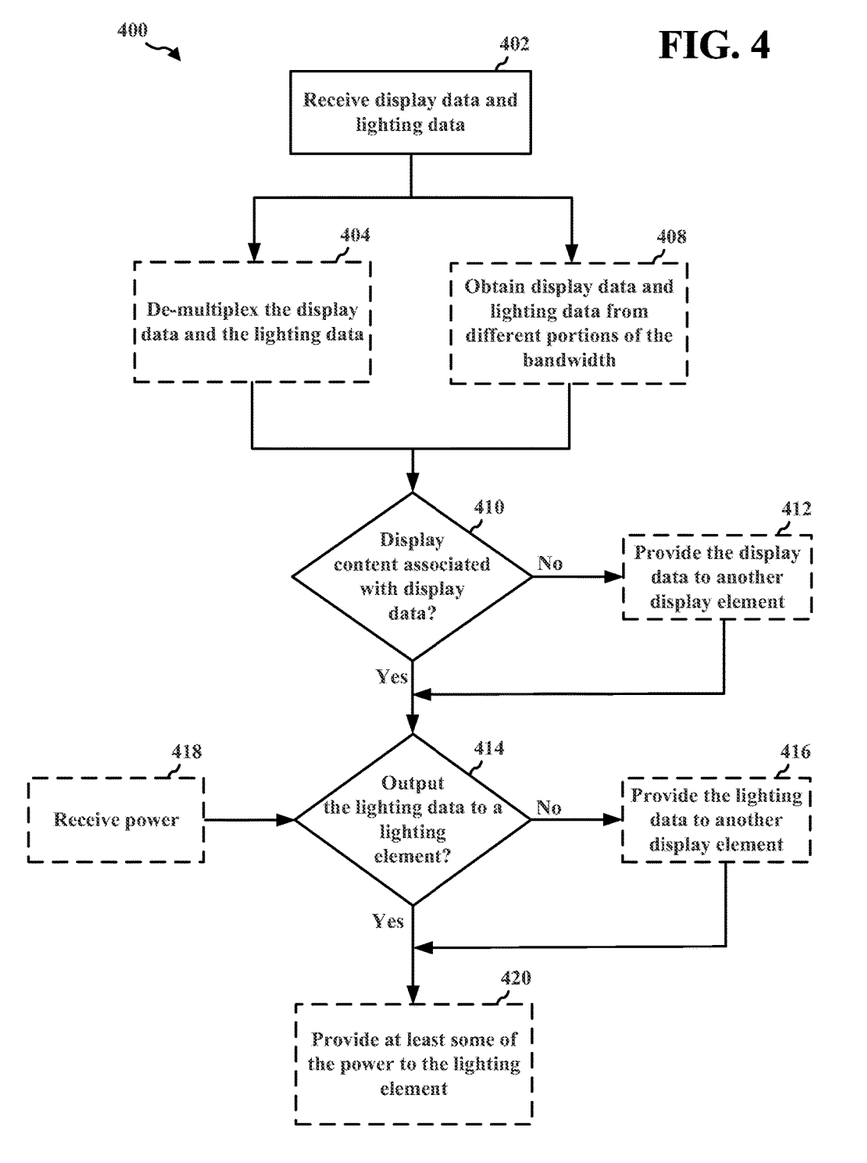
FIG. 4 is a flow chart illustrating an example of various methods.

FIG. 4 is a flow chart 400 illustrating an example of various methods. The methods may be performed by a display element, such as the display element 100$_1$. At step 402, the display element may receive display data 102 and lighting data 104 as a single signal 106, as described in greater detail supra. If the display data 102 and the lighting data 104 are multiplexed in the single signal 106, at step 404, the display element may de-multiplex the display data 102 and the lighting data 104 from the single signal 106. If the display data 102 and the lighting data 104 are included in different portions of the bandwidth 206 of the single signal 106, at step 408, the display element may obtain the display data 102 and the lighting data 104 from the different portions of the bandwidth 206 of the single signal 106.

At step 410, the display element may determine whether to display content associated with the display data 102. If the display element determines to not display content associated with the display data 102, at step 412, the display element may provide the display data 102 to another display element, such as display element 100$_2$. At step 414, the display element may determine whether to output the lighting data 104 to a lighting element, such as the lighting element 110$_1$. If the display element determines to not output the lighting data 104 to the lighting element, at step 416, the display element provides the lighting data 104 to another display element, such as the display element 100$_2$.

At step 418, the display element may receive power 108. After determining to output the lighting data 104 to the lighting element at step 414, the display element may provide at least some of the power 108 to the lighting element at step 414.

Figure 5:
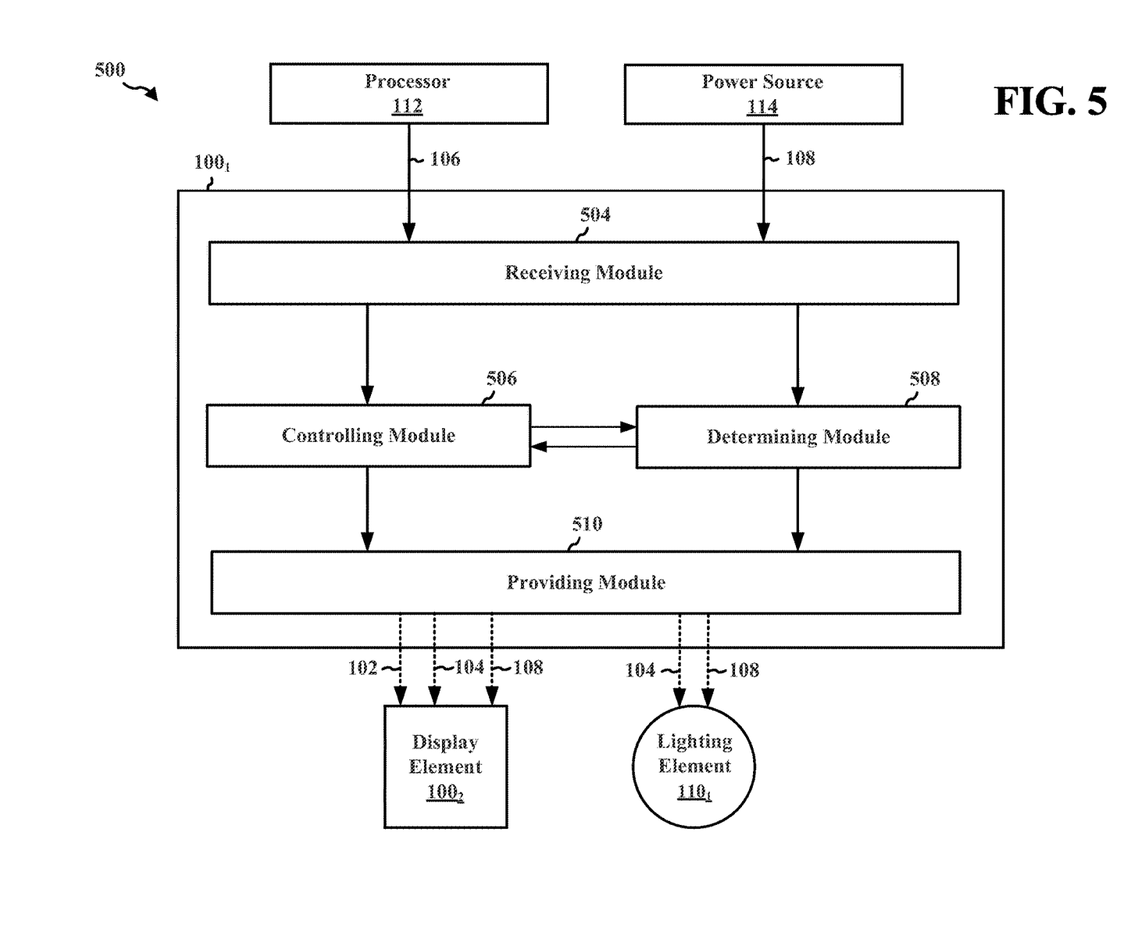
FIG. 5 is a conceptual data flow diagram illustrating data flow between different modules/means/components in a display element.

FIG. 5 is a conceptual data flow diagram 500 illustrating data flow between different modules/means/components in a display element 100$_1$. The display element 100$_1$ may include a receiving module 504, a controlling module 506, a determining module 508, and a providing module 510. The display element 100$_1$ may include additional modules that perform each of the steps of the algorithm in the aforementioned flow charts of FIG. 4. As such, each step in the aforementioned flow chart of FIG. 4 may be performed by a module and the display element 100$_1$ may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The receiving module 504 may be configured to receive display data 102 and lighting data 104 as a single signal 106. The determining module 508 may be configured to determine whether to display content associated with the display data 102. The providing module 510 may be configured to provide the display data 102 to another device or display element 100$_2$ after determining to not display the content associated with the display data 102.

The determining module 508 may be further to determine whether to output the lighting data 104 to a lighting element 110$_1$. The providing module 510 may be further configured to provide the lighting data 104 to another device (e.g., display element 100$_2$) after determining to not output the lighting data to the lighting element 110$_1$.

The receiving module 504 may be further configured to receive power 108. The providing module 510 may be further configured to provide at least some of the power 108 to the lighting element 110$_1$ after determining to output the lighting data 104 to the lighting element 110$_1$.

In some configurations, the display data 102 and the lighting data 104 may be multiplexed in the single signal 106. In such configurations, the controlling module 506 may be further configured to de-multiplex the multiplexed single signal 106 to obtain the display data 102 and the lighting data 104.

In some configurations, the display data 102 may be included in a first portion of the bandwidth of the single signal 106, and the lighting data 104 may be included in a second portion of the bandwidth of the single signal 106. In such configurations, the controlling module 506 may be further configured to obtain the display data 102 from the first portion of the bandwidth and to obtain the lighting data 104 from the second portion of the bandwidth.

Figure 6:
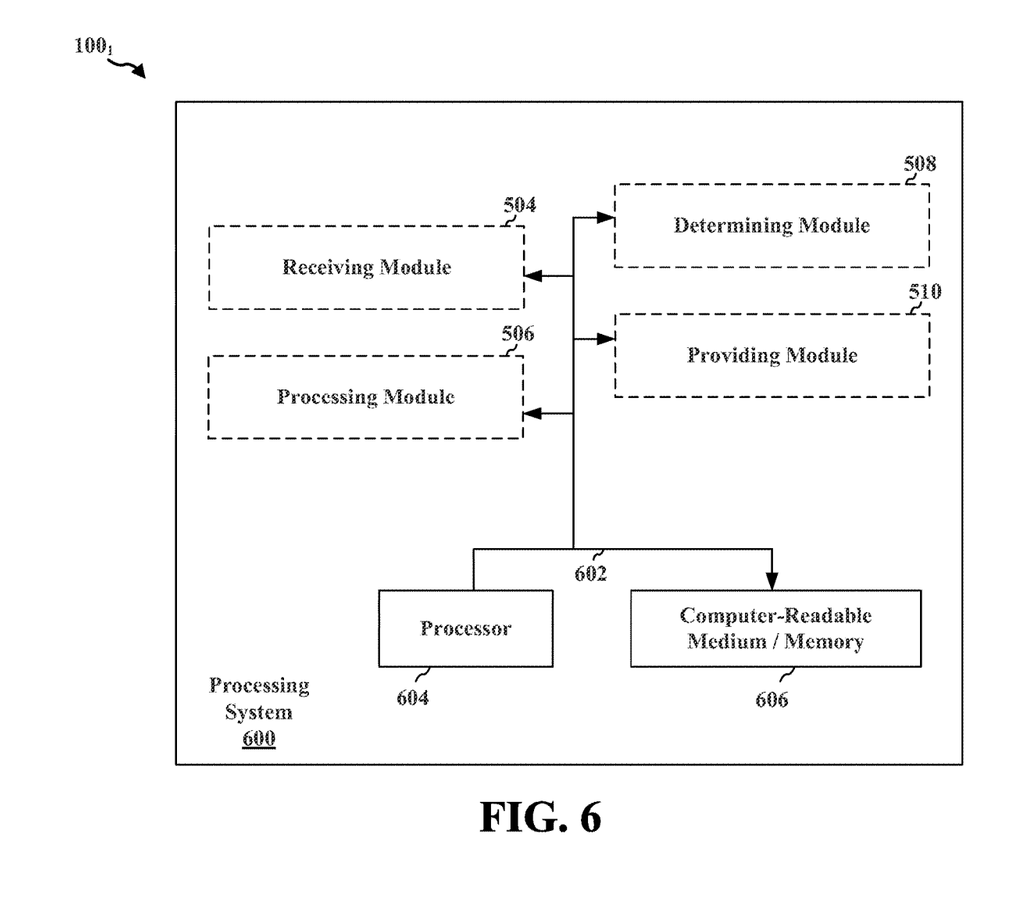
FIG. 6 is a diagram illustrating an example of a hardware implementation for a display element employing a processing system.

FIG. 6 is a diagram illustrating an example of a hardware implementation for a display element 100$_1$ employing a processing system 600. The processing system 600 may be implemented with a bus architecture, represented generally by the bus 602. The bus 602 may include any number of interconnecting buses and bridges depending on the specific application of the processing system 600 and the overall design constraints. The bus 602 links together various circuits including one or more processors and/or hardware modules, represented by the processor 604, the modules 504, 506, 508, 510, and the computer-readable medium/memory 606. The bus 602 may also link various other circuits such as timing sources, peripherals, voltage regulators, and power management circuits, which are well known in the art.

The processing system 600 may be coupled to a transceiver. The transceiver may be coupled to one or more antennas. The transceiver provides a means for communicating with various other apparatuses over a transmission medium. The transceiver receives a signal from the one or more antennas, extracts information from the received signal, and provides the extracted information to the processing system 600, specifically the receiving module 504. In addition, the transceiver receives information from the processing system 600, specifically the providing module 510, and based on the received information, generates a signal to be applied to the one or more antennas.

The processing system 600 includes a processor 604 coupled to a computer-readable medium/memory 606. The processor 604 is responsible for general processing, including the execution of software stored on the computer-readable medium/memory 606. The software, when executed by the processor 604, causes the processing system 600 to perform the various functions described supra for any particular apparatus. The computer-readable medium/memory 606 may also be used for storing data that is manipulated by the processor 604 when executing software. The processing system further includes at least one of the modules 504, 506, 508, 510. The modules may be software modules running in the processor 1604, resident/stored in the computer readable medium/memory 606, one or more hardware modules coupled to the processor 604, or some combination thereof. The processing system 600 may be a component of the display element 100$_1$ and may include other memory and/or at least one other processor.

The display element 100$_1$ having the processing system 600 provides and/or includes means for receiving display data and lighting data as a single signal. In some configurations, the display element 100$_1$ having the processing system 600 provides and/or includes means for providing the display data to another device after determining to not display the content associated with the display data.

The display element 100$_1$ having the processing system 600 provides and/or includes means for determining whether to display content associated with the display data. In some configurations, the display element 100$_1$ having the processing system 600 provides and/or includes means for providing the lighting data to another device after determining to not output the lighting data to the lighting element.

The display element 100$_1$ having the processing system 600 provides and/or includes means for determining whether to output the lighting data to a lighting element. In some configurations, the display element 100$_1$ having the processing system 600 provides and/or includes means for receiving power and means for providing at least some of the power to the lighting element after determining to output the lighting data to the lighting element.

In some configurations, the display data and the lighting data are multiplexed in the single signal. In such configurations, the display element 100$_1$ having the processing system 600 provides and/or includes means for de-multiplexing the multiplexed single signal to obtain the display data and the lighting data.

In some configurations, the display data is included in a first portion of a bandwidth of the single signal, and the lighting data is included in a second portion of the bandwidth of the single signal. In such configurations, the display element 100$_1$ having the processing system 600 provides and/or includes means for obtaining the display data from the first portion of the bandwidth and means for obtaining the lighting data from the second portion of the bandwidth.

The aforementioned means may be one or more of the aforementioned modules of the display element 100$_1$ having the processing system 600 configured to perform the functions recited by the aforementioned means. As described supra, the processing system 600 may include at least one processor. As such, in one configuration, the aforementioned means may be the at least one processor configured to perform the functions recited by the aforementioned means.

Several aspects of a system have been presented with reference to various apparatus, methods, and/or computer program products. Such apparatus, methods, and/or computer program products have been described in the detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of controlling a display device having a processor, a viewing side, an opposing side, a display element, and a lighting element, at least a portion of the display element and lighting element being located on the viewing side of the display device, the display element for forming at least a portion of a display, the lighting element for providing illumination visible to an observer, wherein the display device is configured to be operably connected with a plurality of other display devices to form a larger display, the other display devices each having a display element and a lighting element, the method comprising:

receiving, at the display device, display data and lighting data as a single signal;

interpreting, with the processor, the display data and the lighting data;

determining, with the processor, whether the display data includes data for display on the display element;

determining, with the processor, whether the lighting data includes data for the lighting element;

displaying, with the display element, any display data determined to be for the display element; and providing illumination visible to an observer, with the lighting element, according to any lighting data determined to be for the lighting element; and after determining to not display at least some of the display data and/or after determining to not output at least some of the lighting data to the lighting element, providing the display data and lighting data to at least one of the plurality of other display devices having a display element and a lighting element for determining whether either the display data or lighting data includes data for display or illumination by the other display device.

2. The method of claim 1, further comprising:
receiving power; and
providing at least some of the power to the lighting element after determining to output the lighting data to the lighting element.

3. The method of claim 1, wherein the display data and the lighting data are multiplexed in the single signal.

4. The method of claim 3, wherein the interpreting step includes de-multiplexing the multiplexed single signal to obtain the display data and the lighting data.

5. The method of claim 1, wherein the single signal comprises a bandwidth, and wherein the display data is included in a first portion of the bandwidth and the lighting data is included in a second portion of the bandwidth.

6. The method of claim 5, wherein the interpreting step includes obtaining the display data from the first portion of the bandwidth and obtaining the lighting data from the second portion of the bandwidth.

7. The method of claim 1, wherein the display data comprises data destined for a first type of light-emitting diode (LED), and wherein the lighting data comprises data destined for a second type of LED.

8. The method of claim 7, wherein the data destined for the first type of LED is sourced from a first source, and wherein the data destined for the second type of LED is sourced from a second source different from the first source.

9. The method of claim 8, wherein the display element includes the first type of LED and the lighting element includes the second type of LED, the first and second types of LEDs being located in a same screen area of the display device.

10. The method of claim 9, wherein the first type of LED is configured to emit light comprising a plurality of colors and the second type of LED is configured to emit light comprising a single color.

11. The method of claim 10, wherein the plurality of colors comprises at least red, green, blue, cyan, yellow, amber, or magenta.

12. The method of claim 10, wherein the single color is white.

13. The method of claim 1, wherein the receiving display data and lighting data as a single signal includes receiving display data formatted according to a display data format and receiving lighting data formatted according to a lighting data format, as a single signal, the lighting data format being different than the display data format.

14. A method according to claim 1, wherein the providing step includes providing the display data and lighting data as a single signal to the at least one of the plurality of other display devices.

15. A device, comprising:
a viewing side, an opposing side, a display element, and a lighting element, at least a portion of the display element and lighting element being located on the viewing side of the device, the display element for forming at least a portion of a display, the lighting element for providing illumination visible to an observer;
a data receiving module configured to receive display data and lighting data as a single signal; and
a controlling module configured to:
determine whether to display content associated with the display data on the display element; and
determine whether to output the lighting data to the lighting element;
wherein the controlling module is further configured to do at least one of:
after determining to not display at least some of the content associated with the display data, provide the display data to another device having a display element and a lighting element for determining whether the display data includes data for display by the other device; and
after determining to not output at least some of the lighting data to the lighting element, provide the lighting data to another device having a display element and a lighting element for determining whether the lighting data includes data for illumination by the other device.

16. The device of claim 15, further comprising:
a power receiving module configured to receive power, wherein the controlling module is further configured to provide at least some of the power to the lighting element after determining to output the lighting data to the lighting element.

17. The device of claim 15, wherein the display data and the lighting data are multiplexed in the single signal.

18. The device of claim 17, wherein the controlling module is further configured to: de-multiplex the multiplexed single signal to obtain the display data and the lighting data.

19. The device of claim 15, wherein the single signal comprises a bandwidth, and wherein the display data is included in a first portion of the bandwidth and the lighting data is included in a second portion of the bandwidth.

20. The device of claim 19, wherein the controlling module is further
configured to:
obtain the display data from the first portion of the bandwidth; and
obtain the lighting data from the second portion of the bandwidth.

21. The device of claim 15, wherein the display data comprises data destined for a first type of light-emitting diode (LED), and wherein the lighting data comprises data destined for a second type of LED.

22. The device of claim 21, wherein the data destined for the first type of LED is sourced from a first source, and wherein the data destined for the second type of LED is sourced from a second source different from the first source.

23. The device of claim 22, wherein the first type of LED and the second type of LED are located in a same screen area of the device.

24. The device of claim 23, wherein the first type of LED is configured to emit light comprising a plurality of colors and the second type of LED is configured to emit light comprising a single color.

25. The device of claim 24, wherein the plurality of colors comprises at least red, green, blue, cyan, yellow, amber, or magenta.

26. The device of claim 24, wherein the single color is white.

27. A device according to claim 15, wherein the controlling module is configured to provide the display data and the lighting data as a single signal to the other device.

28. An apparatus, comprising:
a viewing side, an opposing side, a display element, and a lighting element, at least a portion of the display element and lighting element being located on the viewing side of the device, the display element for forming at least a portion of a display, the lighting element for providing illumination visible to an observer;
means for receiving display data and lighting data as a single signal;
means for determining whether to display content associated with the display data with the display element;
means for determining whether to output the lighting data to the lighting element; and
at least one of (1) means for providing the display data to another apparatus having a display element and a lighting element after determining to not display at least some of the content associated with the display data and (2) means for providing the lighting data to another apparatus having a display element and a lighting element after determining to not output at least some of the lighting data to the lighting element.

29. The apparatus of claim 28, further comprising:
means for receiving power; and
means for providing at least some of the power to the lighting element after determining to output the lighting data to the lighting element.

30. The apparatus of claim 28, wherein the display data and the lighting data are multiplexed in the single signal.

31. The apparatus of claim 30, further comprising:
means for de-multiplexing the multiplexed single signal to obtain the display data and the lighting data.

32. The apparatus of claim 28, wherein the single signal comprises a bandwidth, and wherein the display data is included in a first portion of the bandwidth and the lighting data is included in a second portion of the bandwidth.

33. The apparatus of claim 32, further comprising:
means for obtaining the display data from the first portion of the bandwidth; and
means for obtaining the lighting data from the second portion of the bandwidth.

34. The apparatus of claim 28, wherein the display data comprises data destined for a first type of light-emitting diode (LED), and wherein the lighting data comprises data destined for a second type of LED.

35. The apparatus of claim 34, wherein the data destined for the first type of LED is sourced from a first source, and wherein the data destined for the second type of LED is sourced from a second source different from the first source.

36. The apparatus of claim 35, wherein the first type of LED and the second type of LED are located in a same screen area of the apparatus.

37. The apparatus of claim 36, wherein the first type of LED is configured to emit light comprising a plurality of colors and the second type of LED is configured to emit light comprising a single color.

38. The apparatus of claim 37, wherein the plurality of colors comprises at least red, green, blue, cyan, yellow, amber, or magenta.

39. The apparatus of claim 37, wherein the single color is white.

40. An apparatus according to claim 28, wherein the means for providing the display data and lighting data to another apparatus is configured to provide the display data and lighting data as a single signal to the other apparatus.

41. An apparatus, comprising:
a viewing side and an opposing side;
a display element, at least a portion of which is located on the viewing side of the apparatus for forming at least a portion of a display;
a lighting element, at least a portion of which is located on the viewing side of the apparatus for providing illumination visible to an observer;
a memory; and
at least one processor coupled to the memory and configured to:
receive display data and lighting data as a single signal;
determine whether the display data includes data for display on the display element;
determine whether the lighting data includes data for the lighting element; and
after determining the display data includes at least some data that is not for display on the display element and/or after determining the lighting data includes at least some data that is not for the lighting element, provide the display data and the lighting data as a single signal to another device having a display element and a lighting element for determining whether the display data includes data for display by the other device or the lighting data includes data for illumination by the other device.

42. The apparatus of claim 41, wherein the at least one processor is further configured to:
receive power; and
provide at least some of the power to the lighting element after determining to output the lighting data to the lighting element.

43. The apparatus of claim 41, wherein the display data and the lighting data are multiplexed in the single signal.

44. The apparatus of claim 43, wherein the at least one processor is further configured to: de-multiplex the multiplexed single signal to obtain the display data and the lighting data.

45. The apparatus of claim 41, wherein the single signal comprises a bandwidth, and wherein the display data is included in a first portion of the bandwidth and the lighting data is included in a second portion of the bandwidth.

46. The apparatus of claim 45, wherein the at least one processor is further
configured to:
obtain the display data from the first portion of the bandwidth; and
obtain the lighting data from the second portion of the bandwidth.

47. The apparatus of claim 46, wherein the display data comprises data destined for a first type of light-emitting diode (LED), and wherein the lighting data comprises data destined for a second type of LED.

48. The apparatus of claim 47, wherein the data destined for the first type of LED is sourced from a first source, and wherein the data destined for the second type of LED is sourced from a second source different from the first source.

49. The apparatus of claim 48, wherein the first type of LED and the second type of LED are located in a same screen area of the apparatus.

50. The apparatus of claim 49, wherein the first type of LED is configured to emit light comprising a plurality of colors and the second type of LED is configured to emit light comprising a single color.

51. The apparatus of claim 50, wherein the plurality of colors comprises at least red, green, blue, cyan, yellow, amber, or magenta.

52. The apparatus of claim 50, wherein the single color is white.

53. The apparatus of claim 41, wherein the at least one processor is further configured to:
display, with the display element, any display data determined to be for the display element; and
provide illumination visible to an observer, with the lighting element, according to any lighting data determined to be for the lighting element.

54. The apparatus of claim 41, wherein the apparatus is configured to be operably connected with a second apparatus to form a display system, the second apparatus comprising:
a viewing side and an opposing side;
a display element located on the viewing side of the second apparatus for forming at least a portion of a display;
a lighting element located on the viewing side of the second apparatus for providing illumination visible to an observer;
a memory; and
at least one processor coupled to the memory and configured to:
receive, from the apparatus, the display data and lighting data as a single signal;
determine whether the display data includes data for display on the second apparatus display element; and
determine whether the lighting data includes data for the second apparatus lighting element.

* * * * *